Sept. 23, 1958  C. G. SANTESSON  2,852,857
WHEEL ALIGNING APPARATUS
Filed Sept. 27, 1954  2 Sheets-Sheet 2

INVENTOR.
CARL G. SANTESSON
BY
Cook and Schermerhorn
ATTORNEYS

United States Patent Office 2,852,857
Patented Sept. 23, 1958

2,852,857

WHEEL ALIGNING APPARATUS

Carl G. Santesson, Portland, Oreg.

Application September 27, 1954, Serial No. 458,544

8 Claims. (Cl. 33—203.12)

This invention relates to an improved method and apparatus for determining alignment or misalignment of vehicle wheels and frames.

Various methods and apparatus have heretofore been proposed for this purpose, but for the most part the previously known equipment has not been widely used or accepted because of the expensive and complicated nature of some of the devices and because of inadequacy of the simpler devices.

Principal objects of the present invention are to provide an improved method for determining the alignment of vehicle parts, such as the wheels and frames, by the use of relatively simple and inexpensive equipment which may be operated by a mechanic of ordinary skill, to provide a method and apparatus which will reveal certain types of misalignment which are not ordinarily detected with conventional equipment, to provide an improved method and apparatus for accurately determining the relative positions of the four wheels of a vehicle, to provide improved apparatus for marking the wheel positions on a floor surface, and to provide the floor surface with a grid of rectangular coordinates to furnish coordinate values of the wheel positions for use in conventional or special computing machines.

The present invention affords a fast and accurate check on wheel and frame alignment of a vehicle and may utilize either a plain floor surface or a surface marked with rectangular coordinates to record the positions of the four wheels. On a plain floor surface, longitudinal, transverse and diagonal measurements may be made with a tape, while on a graph surface the coordinate values of the wheel positions are used to calculate various distances for comparison with the proper values obtained from factory specifications. Points on the floor surface are established by a novel marking tool having means to engage portions of the wheel assembly of a vehicle driven upon the surface. Forming a part of the marking tool are removable adapters which are engageable with the axle or spindle, or other portion of the wheel assembly, for locating the tool in a predetermined position in relation to the wheel.

The invention will be better understood and additional objects and advantages will become apparent from the following description taken in connection with the accompanying drawings. It is to be understood, however, that the invention may take other forms and that all such modifications and variations within the scope of the appended claims which will occur to persons skilled in the art are included in the invention.

In the drawings:

Figure 6 is a fragmentary perspective view of a vehicle wheel and a still further form of adapter;

Figure 7 is a fragmentary side elevational view of a vehicle wheel and a further form of marking tool adapter; and Figure 8 is a sectional view taken on the line 8—8 of Figure 7.

Figure 1:
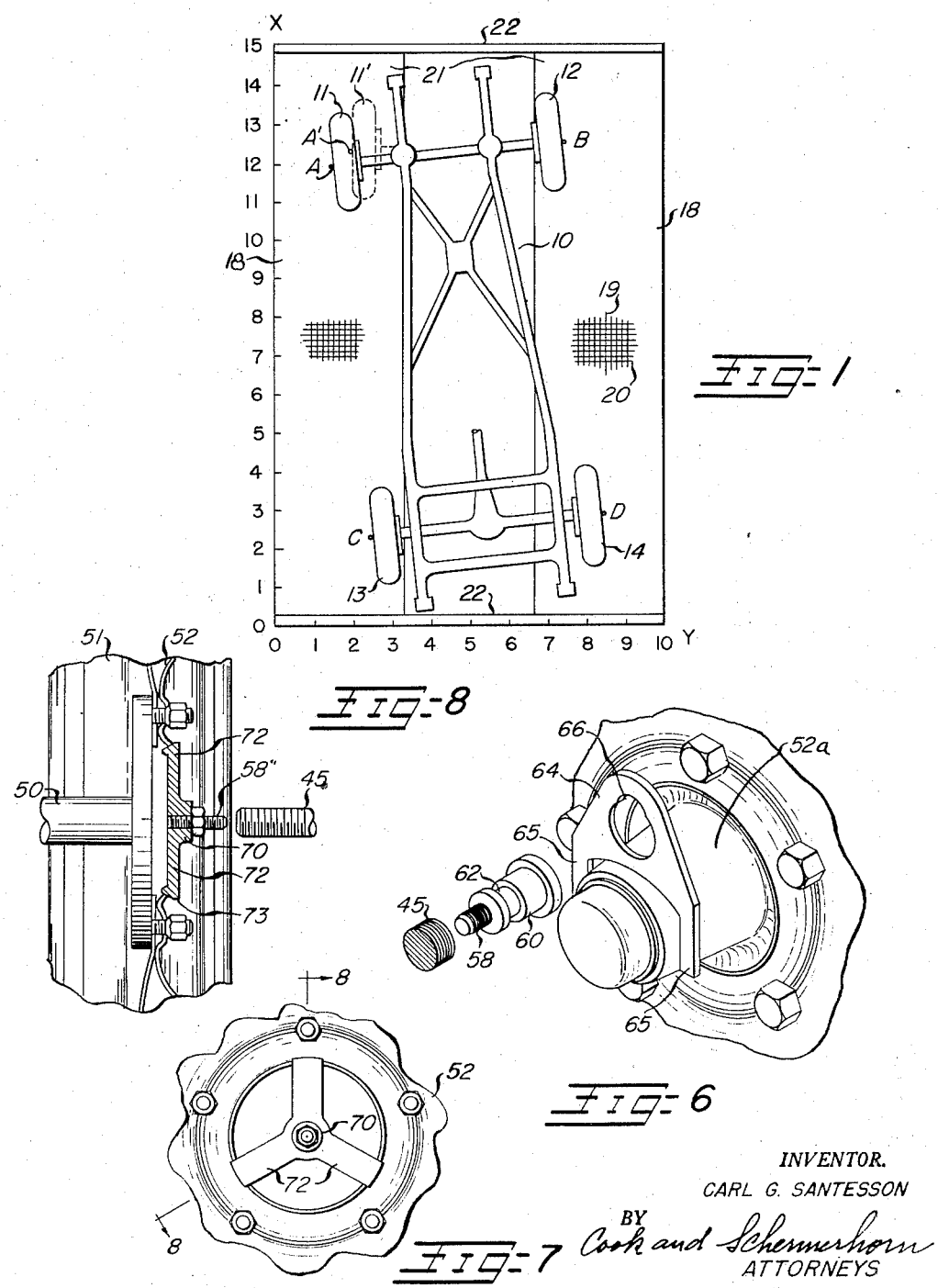
Figure 1 is a top plan view of the floor grid surface having rectangular coordinates and showing a vehicle chassis thereon.

Referring to the drawings and to Figure 1 in particular, there is shown in full lines a vehicle chassis comprising a frame 10, front wheels 11 and 12, and rear wheels 13 and 14. Reference characters A, B, C and D designate specified points which are located on the floor and with respect to the wheels 11–14, respectively, at the outside edge of the tire and directly below the axis of the wheel spindle or axle. Before these points are marked on the floor the tires are inflated to the proper pressure to give them the true width specified by the manufacturer, and each of the vehicle wheels is jacked clear of the floor surface and rotated to check for trueness. If a wheel is bent, it must be taken off and straightened or, alternatively, a straight wheel may be mounted in its place. The front wheel 11 is shown as having a misaligned position 11' in dotted lines which would likely result, for example, if the automobile had been in a collision. The reference character A' designates a point on the floor which is located with respect to wheel 11' in a position similar to the location of point A with respect to wheel 11.

As is well known, the wheel base of an automobile comprises the distance between points A and C, or between B and D, and the wheel tread is the distance between the two front wheels, or the two rear wheels, as the case may be, measured from the center of the tire on one wheel to the center of the tire on the opposite wheel. These distances vary in different makes and models of automobiles, but by comparing the existing wheel base and/or wheel tread with factory specifications, it can be determined whether or not the wheels are out of alignment. In order to determine these distances by use of the present invention, points A, B, C and D must be marked on the floor at the place specified above. It is also possible for misalignment to occur without altering the wheel base and tread distances. An important feature of the invention resides in the facility of making diagonal measurements A—D and B—C to furnish a conclusive check on alignment. If the diagonal distances are not proper, some form of misalignment obviously exists.

The floor grid is designated generally by the reference numeral 18, and is intended to provide a fast alignment check means without removing the vehicle from the grid surface after the points A, B, C, D have been established. The grid surface has X and Y axes with scales of coordinate values as indicated at 19, 20. The X and Y axes intersect at the point O, and these axes, and also the coordinates, if desired, are marked at spaced increments with the distance therefrom so that coordinate values of all the specified points A, B, C, D can be readily ascertained. Lines 19 and 20 are equally spaced at convenient increments, such as tenths of inches or other units of measurement, as desired, and may be provided directly on the floor surface on metal plates 21 resting on, or incorporated in, the floor, or on an alignment rack of the type which is in present day use. Plates 21 are maintained in fixed relation to each other by cross members 22.

To determine alignment of a vehicle, the vehicle is driven onto the grid surface at random without regard to parallel alignment with either axis. The front wheels are adjusted to straight ahead position with relation to the vehicle in any well known manner to establish a starting position for subsequent steps of the method. Points A, B, C and D are then located and marked on the grid surface at the edge of each tire directly below the wheel axis by a novel tool to be explained hereinafter. With the points A, B, C, D established on the grid surface, the wheel treads, wheel bases, if not already measured, and diagonals A—D and B—C can be calculated from readings taken from the grid scales without removing the vehicle from the grid. An alternative method for establishing a starting position for the subsequent steps, instead of adjusting the front wheels to a straight ahead position, is to adjust the front wheels so that the respective wheel bases are the same, this step being accomplished by a tape measure or conventional instruments provided for this purpose.

As the width of present day tires may vary, the actual wheel treads of the front or rear wheels is obtained by subtracting a half width of each tire in the pair from the readings A—B or C—D, as the case may be. If the tires in a pair have equal width, then, of course, the width of one tire of the set may be subtracted from the reading between the respective points mentioned. It will be apparent to persons skilled in the art that the mathematical calculations may be performed with facility by a special square root calculating machine which may be arranged to utilize the given data, without requiring mathematical skill on the part of the operator, and a standard square root calculator may be used with a small amount of skill.

The computed wheel bases and wheel treads can be compared with factory specifications to determine whether they have their normal measurement. If the wheel tread were to be calculated between the misaligned wheel 11' and wheel 12, as explained above, it would readily be apparent that it would not correspond to the factory specifications. A comparison of the actual distance calculated and the factory specifications for the wheel tread for that particular automobile would show the amount of misalignment present.

The invention also possesses important advantages without the use of the coordinate graph on the floor. After having marked the points A, B, C, D on a plain floor surface, or on an alignment rack, for example, the various distances A—B, C—D, A—C, B—D, A—D and B—C may be measured with a tape or trammel points mounted on a scale, if desired.

Figures 2, 3:
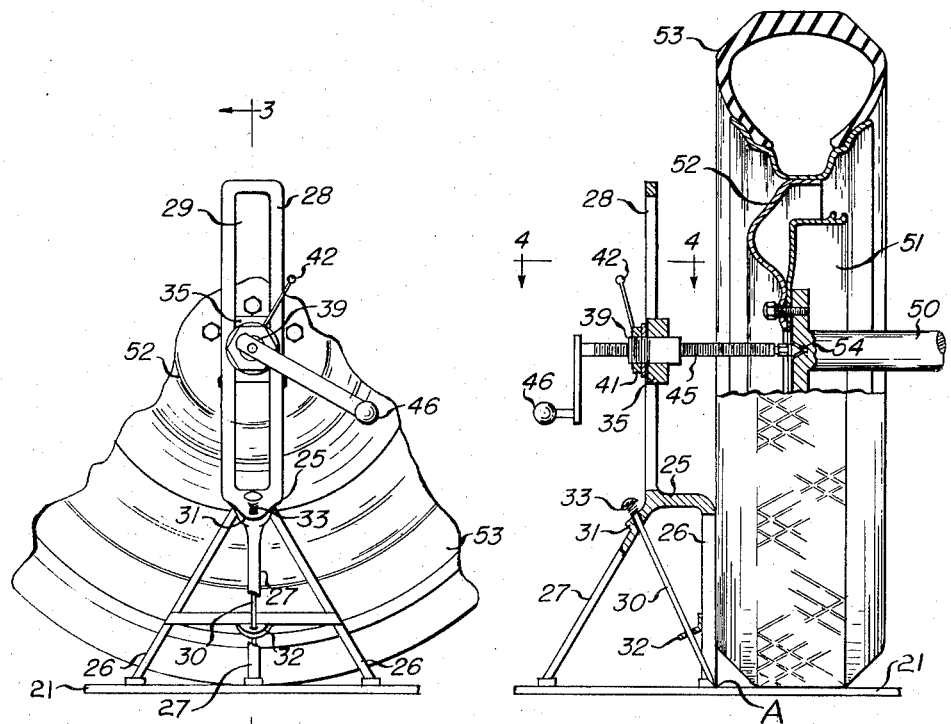
Figure 2 is an elevational view of the present floor marking tool and showing the tool in engagement with a vehicle wheel assembly.
Figure 3 is a sectional view of the tool taken on the line 3—3 of Figure 2.
Figures 4, 5:
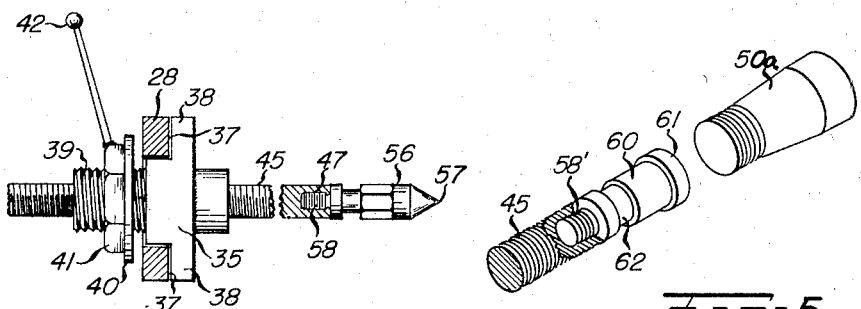
Figure 4 is a fragmentary sectional view taken on the line 4—4 of Figure 3, showing in particular vertical and horizontal adjusting mechanism of the tool and one form of removable adapter for locating the axis of the wheel.
Figure 5 is a perspective view of another form of adapter removably mounted on the tool.

Referring now to Figures 2–4, there is shown a novel floor marking tool for establishing the points A, B, C, D. This tool comprises a standard 25 having a pair of laterally inclined front legs 26, an inclined rear leg 27 and a vertical guide plate 28 offset from the front of the tool and having a slot 29 extending substantially the length thereof. A marking pin 30 is slidably mounted in the standard 25 and is guided in a diagonal direction through a pair of apertured ears 31 and 32. The pin 30 is centered below the slot 29, as seen in Figure 2, and the marking end thereof is adapted to engage the floor at a point aligned with the front face of legs 26, as seen in Figure 3. A small compression spring 33 is mounted on the pin and engages ear 31 and the head of the pin, normally to bias the pin upwardly and space the point thereof above the floor surface. A mark is made on the floor surface by tapping the head of the pin.

Slidably mounted in the slot 29 of guide plate 28 is a head 35 notched at 37 on each side, Figure 4, to form side flanges 38 for engaging the front surface of vertical guide plate 28. Head 35 has a threaded shank 39 to receive a washer 40 and a nut 41 provided with a turning handle 42. Head 35 is slidable vertically in guide plate 28 and can be locked in desired vertical positions by threading nut 41 on the shank 39 a sufficient amount to move the washer 40 into firm engagement with the rear surface of the plate 28. The interior of head 35 is provided with a threaded bore to receive a screw shaft 45. Shaft 45 has a crank handle 46 on one end and has a threaded socket 47, Figure 4, extending axially inwardly from the opposite end.

It is the purpose of the marking tool to establish the points A, B, C, D on the floor at the edge of the tire and directly beneath the wheel axis, and, therefore, to locate the tool in the proper position for marking, the axis of screw 45 must be vertically aligned with the axis of the vehicle axle or wheel. The wheel assemblies and axle arrangements on the various automobiles differ, and it is contemplated herein to provide adapters for the marking tool which can be used to engage any common type of vehicle axle or wheel assembly and locate the tool in a marking position.

Referring to Figure 3, wheel assemblies comprise an axle 50, hub and drum 51, wheel disc 52, and tire 53. In many instances, axles or spindles are provided with a turning center depression 54. An adapter 56, best shown in Figure 4, has a pointed end 57 for engaging the turning depression 54 of the axle, and is provided with a threaded shank 58 on the end opposite from the end 57 for threadedly engaging the socket 47 of screw shaft 45. By loosening nut 41 the head 35 is slidable vertically to align the axis of the adapter with the vehicle axle, and by rotating screw shaft 45 by means of crank handle 46 the adapter is moved horizontally into engagement with the depression 54 in the axle. As seen in Figure 3, the tool is positioned against the tire 53 so that when the adapter engages the vehicle axle the marking pin, which is centered in the tool, is adapted to make a mark directly below the axis of the axle and vertically aligned with the outside edge of the tire. The laterally inclined front legs 26 of the marking tool permit the tool to engage the side walls of the tire up from the bottom and, therefore, span the usual flattened portion of the tire at the bottom.

Figure 5 shows another form of adapter 60 for aligning the tool with an axle or spindle 50a which has no turning center depression. This adapter has a threaded shank 58' on one end for mounting on the screw shaft 45, and on its other end has a flat face portion 61 which is preferably threadedly mounted on the adapter 60 and is adapted to be abutted against the end of the axle 50a with the axis thereof aligned with the axis of the axle to locate the tool in a marking position.

The adapter 60 has a reduced neck portion 62, and, as seen in Figure 6, the adapter can be used in conjunction with a guide plate 64 having a pair of arms 65 for disposition straddling the outer periphery of a projecting portion of a wheel hub. The plate 64 has a keyhole opening 66 for receiving the adapter therein, the neck portion 62 of the adapter engaging the reduced portion of the opening 66. Plate 64 is used in conjunction with wheels having a projecting hub portion 52a.

In Figures 7 and 8, another adapter 70 is shown, this adapter having a threaded shank portion 58" for engagement with screw shaft 45 similar to the other adapter embodiments. Adapter 70 has three arms 72 having rounded outer end portions 73. This adapter is conveniently used in wheel assemblies in which the axle or spindle does not project outwardly beyond the hub and where no turning center on the axle is accessible. The adapter is axially aligned with the wheel by seating the end surface of the arms 72 on the edge of the central opening in the wheel disc, as shown.

A set of adapters as shown in Figures 4–8 will provide aligning means for the marking tool for most conventional automobiles now in use. The adapters are easily installed on and removed from the tool, and provide an accurate locating means to position the tool in the same position on each wheel.

The equipment of the present invention may be used with conventional equipment for measuring camber, caster, king pin inclination, toe-in, and turning radii.

Having now described my invention and in what manner the same may be used, what I claim as new and desire to protect by Letters Patent is:

1. A tool for establishing a point in predetermined relation to a vehicle wheel assembly comprising a standard, a head movable vertically in said standard, means in said head movable horizontally to register with said wheel assembly and align said tool vertically with the axis of said wheel, and marking means in said standard for establishing said point on the floor at the outer edge of said wheel.

2. A tool for establishing a point in predetermined relation to a vehicle wheel assembly comprising a standard, a head adjustably mounted for vertical movement in said standard, a screw shaft adjustably mounted for horizontal movement in said head, means on said shaft for locating the axis of said wheel, and marking means in said standard for establishing a point on the floor at the outer edge of said wheel vertically beneath the axis of the wheel.

3. A tool for establishing a point on a floor surface in predetermined relation to a vehicle wheel assembly, comprising a support, a front edge on said support disposed in a vertical plane for engaging the outside edge of said wheel, vertical and horizontal adjustable means on said support for locating the axis of said wheel and aligning the tool vertically with said axis, and marking means on said support for establishing said point on the floor in said vertical plane and vertically beneath the axis of the wheel.

4. The invention as defined in claim 2 wherein said first mentioned means comprises a pointed shank portion arranged to engage an axial depression in the vehicle wheel assembly axle.

5. The invention as defined in claim 2 wherein said first mentioned means comprises radial extensions having end surfaces arranged to engage a central opening in said wheel assembly.

6. The invention as defined in claim 2 wherein said first mentioned means comprises a bifurcated plate arranged to straddle a hub in the wheel assembly.

7. The invention as defined in claim 2 wherein said first mentioned means comprises a bifurcated plate arranged to straddle a hub in the wheel assembly and a connector between said screw shaft and said bifurcated plate.

8. A device for checking wheel or frame alignment of a vehicle comprising a floor grid surface having a single system of rectangular coordinate markings of a dimension to receive all four wheels of a vehicle, said coordinate markings being identified by numerical indicia for determining the coordinate values of the four wheel positions, a marking tool movable on said grid surface to establish a point on said grid in predetermined relation with each wheel position, a head movable vertically in said tool, means in said head movable horizontally to register with a wheel assembly and align said tool vertically with the axis of said wheel, and marking means in said tool for establishing said point on said surface at the outer edge of said wheel.

References Cited in the file of this patent

UNITED STATES PATENTS

| | | |
|---|---|---|
| Re. 21,052 | Haucke | Apr. 18, 1939 |
| 1,641,243 | Wochner | Sept. 6, 1927 |
| 1,761,163 | Weaver | June 3, 1930 |
| 1,959,642 | Phelps | May 22, 1934 |
| 2,167,361 | Haucke | July 25, 1939 |
| 2,249,226 | Peters | July 15, 1941 |
| 2,354,862 | Houghton | Aug. 1, 1944 |
| 2,488,043 | Vigneron | Nov. 15, 1949 |

OTHER REFERENCES

Crouse: "Automotive Mechanics," Second Edition, McGraw-Hill Book Co., Inc., New York, 1951, pages 678, 679, TL 205 C7.